United States Patent [19]

Ault et al.

[11] 3,725,790

[45] Apr. 3, 1973

[54] SHIFT REGISTER CLOCK PULSE DISTRIBUTION SYSTEM

[75] Inventors: Cyrus Frank Ault, Wheaton; Robert Graham Spencer, North Aurora, both of Ill.

[73] Assignee: Bell Telephone Laboratories, Incorporated, Berkeley Heights, N.J.

[22] Filed: June 1, 1971

[21] Appl. No.: 148,317

[52] U.S. Cl..................328/37, 307/208, 307/221 C, 307/269, 307/293, 307/304, 328/56

[51] Int. Cl.........................H03k 23/00, H03k 19/08

[58] Field of Search....307/221, 208, 246, 269, 296, 307/304, 293; 328/37, 55, 56, 67; 333/29, 70 CR

[56] References Cited

UNITED STATES PATENTS

| | | | |
|---|---|---|---|
| 3,502,991 | 3/1970 | Sampson | 328/56 X |
| 3,436,689 | 4/1969 | Fluhr | 307/293 X |
| 3,520,996 | 7/1970 | Boothroyd | 333/29 X |
| 3,471,711 | 10/1969 | Poschenrieder et al. | 328/37 X |
| 3,381,246 | 4/1968 | Perry | 333/29 X |
| 3,454,719 | 7/1969 | Horstmann et al. | 328/56 X |
| 3,564,146 | 2/1971 | Poschenrieder et al. | 307/246 X |
| 3,395,292 | 7/1968 | Bogert | 307/304 X |

*Primary Examiner*—Stanley D. Miller, Jr.
*Attorney*—R. J. Guenther and R. B. Ardis

[57] ABSTRACT

A clock pulse distribution bus for an MOS shift register having a large clock terminal input capacitance comprises a plurality of serially connected inductance elements. The shift register stages are organized into groups and the clock terminals of each group are connected to a different node of the bus between inductance elements. The inductance elements and the input capacitance of the clock terminals form a lumped parameter delay line which staggers in time the charging of the input capacitance of successive groups of clock terminals. Only the resistive characteristic impedance of the delay line thus formed is presented to the clock pulse driver, rather than the dynamically lower impedance of a large capacitive load.

6 Claims, 7 Drawing Figures

INVENTORS C. F. AULT
R. G. SPENCER
BY John C Albrecht
ATTORNEY

SHIFT REGISTER CLOCK PULSE DISTRIBUTION SYSTEM

BACKGROUND OF THE INVENTION

This invention relates generally to shift registers and more particularly to a clock pulse distribution system for devices exhibiting large clock terminal input capacitance, e.g., MOS shift registers.

One problem in the design of high speed metal-oxide-semiconductor (MOS) shift registers is the distribution of clock pulses to the large capacitive load presented by the great number of clock terminals. Although a similar problem exists with any type of semiconductor device, the situation is particularly acute in MOS shift registers because of the unusually high input capacitance of these devices, due to their high parasitic and internal device capacitance. As the number of stages in the shift register increases, the cumulative input capacitance of all of the clock terminals which must be pulsed to transfer information becomes prohibitively large, requiring large currents if all stages are to be pulsed simultaneously, as has traditionally been done. For example, in a 1 million bit MOS shift register, this cumulative capacitance can approach 0.2 microfarad, and to supply enough charge to change this quantity 15 volts in 10 nanoseconds would require a 300 ampere driver current. Nevertheless, there are many other advantages which make MOS devices very attractive for use in the fabrication of large shift registers, e.g.: low cost and low power dissipation.

Prior art solutions to the clock pulse distribution problem have involved either the use of clock drivers which are capable of producing large currents, or the technique of segregating the clock terminals into groups and pulsing each group with a separate smaller driver. Both of these solutions are expensive; in addition, the former causes significant power loss through heat dissipation in the high current drivers.

Accordingly, it is the object of this invention to provide an effective clock drive system with reduced power dissipation for MOS shift registers.

SUMMARY OF THE INVENTION

A shift register memory typically comprises a plurality of serially connected memory stages. Each of the stages has an input terminal, an output terminal, and a clock terminal responsive to applied clock pulse signals to shift data between stages. Means for applying signals to the input terminal of the first stage of the memory and means for detecting signals at the output terminal of the last stage of the memory are also provided.

In accordance with this invention the memory stages are organized into uniform groups. Clock pulse signals are distributed to the corresponding clock terminals of these groups by a bus comprising a plurality of inductance elements connected in series, the clock pulse signals being applied to the first of this plurality of inductance elements. For each group, the clock terminals of all of the stages in that group are connected to a corresponding node between inductance elements. Terminating means are connected to the bus thus formed.

Thus, in accordance with this invention, the clock drive system of an MOS shift register comprises a plurality of inductance elements connected in series to form a bus. Advantageously, the bus staggers in time the charging of the input capacitance of the clock terminals of successive groups of memory stages connected to nodes between the inductance elements, thereby reducing the current driver requirements to below that required if the total clock terminal input capacitance of all of the shift register stages is charged simultaneously. A single current driver of a relatively small size can then supply clock pulses for the entire shift register since it need drive only the resistive characteristic impedance of the bus as defined by the magnitude of the inductance elements and the cumulative input capacitance of the clock terminals of the memory stages in each group, rather than the large capacitive load presented by the cumulative input capacitance of all of the clock terminals in the entire shift register. Furthermore, no large resistances exist in the clock pulse distribution system to cause substantial power dissipation.

In at least one embodiment of this invention the first and the last of these inductance elements each have a magnitude equal to one-half that of the remainder of the plurality of inductance elements. Also in at least one embodiment of the invention the aforementioned terminating means comprises a resistor connected between the last of the plurality of inductance elements and a source of ground for the clock pulse signals, the resistor having a magnitude equal to the characteristic impedance of the bus.

BRIEF DESCRIPTION OF THE DRAWING

This invention will be clearly understood from the following description of an illustrative embodiment when read with respect to the drawing wherein.

DETAILED DESCRIPTION

Figure 1:
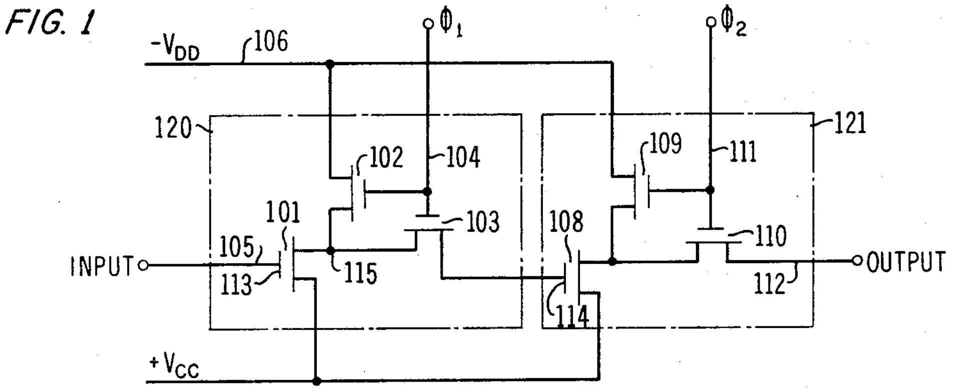
FIG. 1 depicts an exemplary MOS shift register stage.

One exemplary MOS shift register stage is shown in FIG. 1. It is to be understood that this is but one of the many variations of the basic shift register stage to which the present invention can advantageously be applied. In the particular example shown, each stage of the shift register comprises two identical Inverter Sections 120 and 121 in series, each of which uses three MOS devices, thereby requiring a total of six MOS devices per shift register stage. In the example shown, p-channel devices are assumed throughout. Two voltages are provided to supply power to each stage: $+V_{CC}$, a positive voltage, is supplied to Line 107, and $-V_{DD}$, a negative bias, is supplied to Line 106. In addition, two clock phases must be supplied to each stage. These are represented in FIG. 1 by $\phi_1$, supplied to Line 104, and $\phi_2$ supplied to Line 111.

In operation, the input signal to the shift register stage is the charge residing in the parasitic and intrinsic capacitance associated with the Gate 113 of MOS device 101, deposited there by the previous stage via Input Line 105. When clock $\phi_1$ goes negative, Devices 101 and 102 form an inverter. Device 101 performs the actual inverting while Device 102 acts as a switched load. Since the load is present only when the device is clocked "on" by $\phi_1$, power dissipation is reduced. If the charge on the Gate 113 of Device 101 is sufficiently negative to cause it to conduct strongly, Node 115, the node common to Device 101, 102, and 103, will approach $V_{CC}$ (a positive level). However, if the charge at the Gate 113 of Device 101 is positive enough to leave it cut off, then Node 115 will approach $V_{DD}$ (a negative bias) when $\phi_1$ becomes negative.

When $\phi_1$ goes negative, Device 103 also conducts and charges or discharges the parasitic and intrinsic capacitance of the Gate 114 of Device 108, the input device for the second inverter section, to the same potential as Node 115. This potential is retained at the Gate 114 of Device 108 after $\phi_1$ is removed. The function of Device 103 is to isolate the two inverter sections at all times other than during a clocked transfer of information. A $\phi_2$ clock pulse on Line 111 transfers and inverts the data again, passing it to the input of the next shift register stage via Output Line 112. The operation of Devices 108, 109, and 110 under control of $\phi_2$ clock pulses in the second inverter section of this exemplary shift register stage is identical to the operation of Devices 101, 102, and 103 under control of $\phi_1$ clock pulses in the first section. Thus, the shifting of data through a single stage is accomplished in two steps: transfer and inversion from the input of the shift register stage (the input of the first inverter section) to the input of the second inverter section, followed by transfer and inversion from that input to the output of the shift register stage (the output of the second inverter section).

Figure 2:
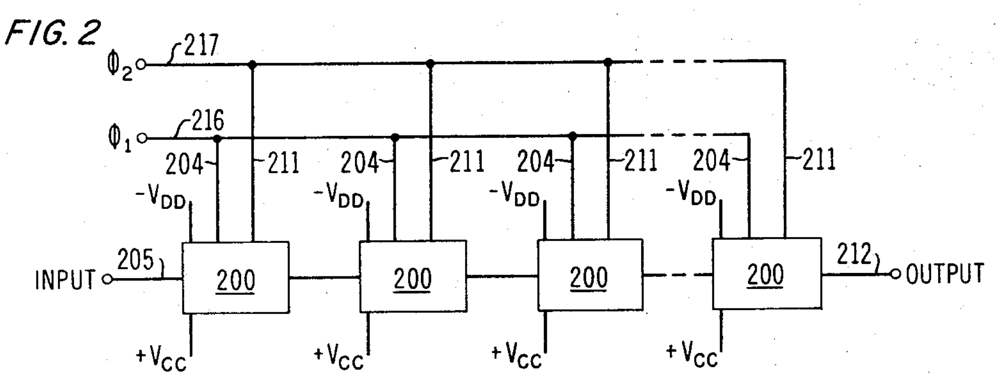
FIG. 2 illustrates a shift register comprised of a plurality of the stages of FIG. 1 serially interconnected.

An exemplary shift register formed from a plurality of identical serially connected stages is shown in FIG. 2. Each of the Stages 200 comprises the circuitry shown in FIG. 1. Power is supplied as $+V_{CC}$ and $-V_{DD}$ to each stage as described above, respectively. Two phases of clock pulses are supplied to each stage: $\phi_1$ over Bus 216 to Lines 204 and $\phi_2$ over Bus 217 to Lines 211. The shift register input is on Line 205 to the input of the first stage while the shift register output is from the output of the last stage on Line 212.

Figure 3:
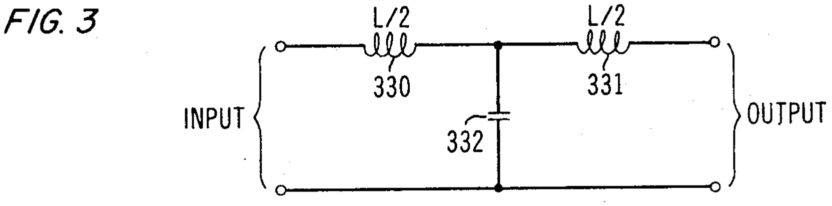
FIG. 3 shows a single T-section of a lumped parameter delay line.

A complete understanding of the present invention requires as background a discussion of the general properties of lumped parameter delay lines. Such delay lines comprise a plurality of "T" sections interconnected in series, one section of which is shown in FIG. 3. An equivalent "Pi" section delay line can readily be derived, using elementary network theory. Each T-section comprises two Inductors 330 and 331 of magnitude L/2 each and a Capacitor 332 of magnitude C connected from a point between the inductors to the other leg of the delay line. When several T-sections are interconnected, the two abutting inductors from adjacent sections can be replaced by a single inductor of magnitude L.

It is well known that a lumped parameter delay line has an upper frequency $f_c$ known as the cutoff frequency and defined by the equation:

$$f_c = 1/\pi \sqrt{LC}.$$

Below this cutoff frequency the attenuation of an ideal delay line is zero. The phase shift of a sinusoidal wave passing through a section of delay line is a function of the cutoff frequency $f_c$ of the line and the frequency of the applied signal. For input signals of frequency much less than $f_c$, the time delay (or phase shift) per section $t_s$ is approximated by the equation:

$$t_s = (1/\pi f_c) = \sqrt{LC}.$$

Finally, the input impedance of a delay line section is called the characteristic impedance. It, too, is dependent on the cutoff frequency $f_c$ and the frequency of the applied sinusoidal input signal, but for applied signals of frequency much less than $f_c$ the characteristic impedance $Z_O$ can be approximated by the equation:

$$Z_O = \sqrt{L/C}.$$

Clock pulse signals $\phi_1$ and $\phi_2$ are square waves (typically, asymmetrical). However, under a Fourier analysis, they can be represented by a plurality of sinusoidal inputs of different frequencies, all superimposed on one another. The leading and trailing edges of the square waves are voltage steps, and the delay per section $t_s$ when a voltage step is applied to the input can be determined to be 1.07 times the delay calculated for a sinusoidal input. The slight increase in time is due to the presence of frequency components in the step in the vicinity of $f_c$. A delay line can be defined in terms of its parameters and characteristics as follows:

$$C = t_d/1.07\, n\, Z_O$$

and $$L = (t_d Z_O)/1.07\, n$$

where $t_d$ is the total delay for the line and is defined by $t_d = n_{ts}$, $n$ being the number of sections in the line.

The application of pulses rather than sinusoidal inputs to a T-section lumped parameter delay line results in pulse distortion. This arises because $t_d$ and $Z_O$ are frequency dependent, as mentioned above, and therefore have a different value for each of the many frequency components making up the applied pulse. However, most of these components are in the frequency range extending from about zero to the inverse of the rise time of the pulse. When the components are nearly all far below the cutoff frequency $f_c$ of the delay line, distortion is minimized and $t_d$ and $Z_O$ can nominally be represented by the equations previously set out herein. Therefore, a delay line with small values of L and C and a correspondingly large value of $f_c$ is a desired objective. It should be recognized though that such a line has a small delay per section $t_s$.

Constraints on $f_c$ and $t_s$ may not allow them to be chosen to provide an acceptable level of pulse distortion, e.g., a very large delay per section or a very low cutoff frequency may be desired. In such cases it is well known to anyone skilled in the art that a delay line whose inductance elements are mutually coupled will further reduce distortion by providing a nearly flat response over a greater portion of the frequency spectrum. Such a delay line is known as an *m*-derived T-section delay line and the use of this technique is well within the scope and spirit of the present invention.

Figure 4:
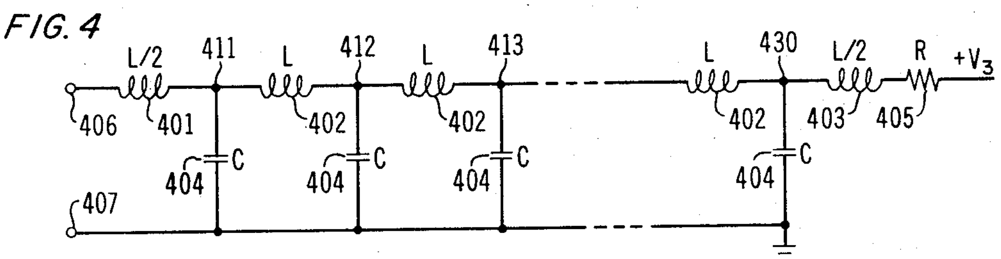
FIG. 4 illustrates a delay line formed by interconnecting in series a plurality of the T-sections of FIG. 3.

The application of the present invention in a shift register clock pulse distribution system can now be described in light of the general explanations of shift register operation and delay line theory presented above. FIG. 4 shows a plurality of T-sections interconnected in series to form a delay line. The line is terminated through a Resistor 405 to a source of constant voltage V3. To AC signals such as pulses, a DC voltage source such as V3 has the same appearance as a source of ground. Therefore, in an AC analysis, the delay line of FIG. 4 is terminated directly to ground through Resistor 405. The terminating Resistor 405 has a magnitude R chosen to be equal to $Z_O$, the characteristic impedance of the delay line. As explained above, $Z_O$ can be nominally approximated as a constant value even in the presence of pulse inputs. Matching the terminating resistor to the characteristic impedance minimizes reflections of signals back down the line. Inductors 401 and 403, the first and last inductors of the delay line, each have a magnitude of L/2. The inductors 402 each comprise two adjacent inductances both of magnitude Inductors 2 but are represented by their series equivalent of a single inductor of magnitude L.

Figure 5:
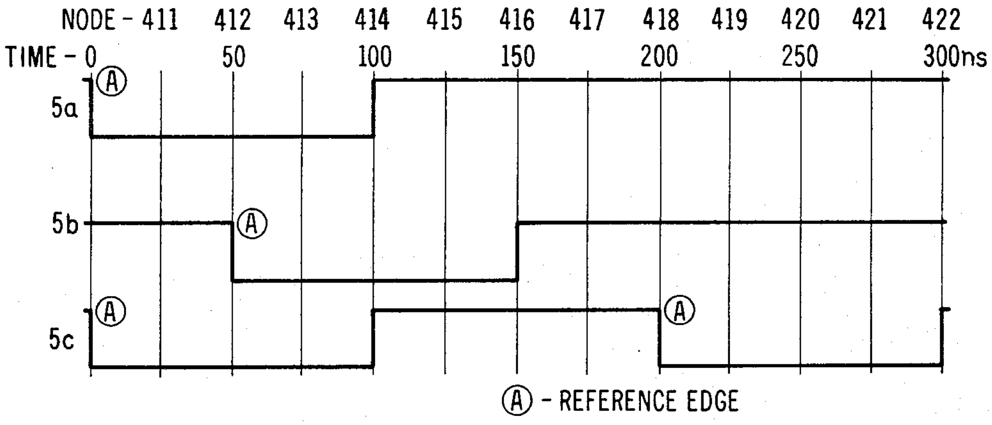
FIG. 5 is a timing chart indicating the delay a pulse encounters while propagating down a delay line.

In the illustrative embodiment of this invention, the inductors comprise a clock pulse distribution bus and the capacitors represent load sources for these clock pulses. Each of the Capacitors 404 has a magnitude C and represents the cumulative input capacitances, both parasitic and intrinsic, of the gates of the plurality of MOS devices which is connected in parallel to a specific node on the distribution bus. For example, if the clock pulse terminals of 100 shift register stages are connected at each node then, as can be seen from FIG. 1, two hundred MOS gates would be connected in parallel at that node on the $\phi_1$ clock pulse bus and 200 on the $\phi_2$ clock pulse bus. Clock pulses applied at the input of the delay line are delayed by a fixed amount $t_s$ as they pass through each successive section of the line. Therefore, instead of a single clock pulse simultaneously charging the capacitance of all of the MOS gate terminals connected to the distribution bus, the delay line causes the charging of subsequent sections to be staggered in time. This effect can be better understood by reference to the timing charts of FIG. 5. Plot 5*a* shows the first pulse of a sequence of clock pulses, each of 100 nanoseconds duration with an interval of 100 nanoseconds separating successive pulses, referenced to the time the trailing edge passes the input to the delay line of FIG. 4 at Terminal 406. For the purposes of this explanation, let it arbitrarily be assumed that each section of the delay line has a delay $t_s$ of 25 nanoseconds, and that the clock pulse must be present for 100 nanoseconds to allow all of the stages connected at any one node on the delay line to satisfactorily operate. It will be noted also that FIG. 5 shows only one phase of the two clock phases required for operation of the inverter sections of FIG. 1. The pulses of the two clock phases are displaced in time. However, the relative timing sequences of the two phases are identical and both phases need not be shown.

Plot 5*b* shows the pulse of plot 5*a* at a later point in time as its trailing edge passes Node 412. After traversing two sections of delay line, the pulse has been delayed 50 nanoseconds.

Plot 5*c* shows this same pulse again as its trailing edge passes Node 418, the eighth node of the line. Each section of the line has delayed the pulse 25 nanoseconds for a total of 200 nanoseconds. Since the pulse is 100 nanoseconds wide, however, it appears at four adjacent nodes simultaneously as it propagates down the line; in plot 5*c* the pulse simultaneously appears at Nodes 418 through 421. At the same time the second pulse of the string is simultaneously appearing 200 nanoseconds earlier at Nodes 411 through 413. This later pulse flanks only three nodes at this time since it has not yet completely entered the delay line.

Under the control of a string of pulses 100 nanoseconds wide appearing every 200 nanoseconds, data is being shifted through the shift register at a rate of 200 nanoseconds per stage. This rate is determined by the fact that a shift through a single stage requires a $\phi_1$ clock pulse (100 nanoseconds here) followed by an out-of-phase $\phi_2$ clock pulse (also 100 nanoseconds here). For any given stage *m* of the shift register the present invention delays the shifting operation of that stage by $m \times t_s$ nanoseconds. Therefore, stages at the end of the shift register are still shifting under the control of a first clock pulse in an applied string at the same time earlier stages are again shifting under the control of subsequent clock pulses. Advantageously, however, a single quantum of charge is passed from one group of stages to the next to accomplish the shifting. This eliminates the need for supplying a much larger quantum of charge sufficient to charge the total cumulative input capacitance of the clock terminals of all of the shift register stages, required for all stages to shift simultaneously.

Figure 6:
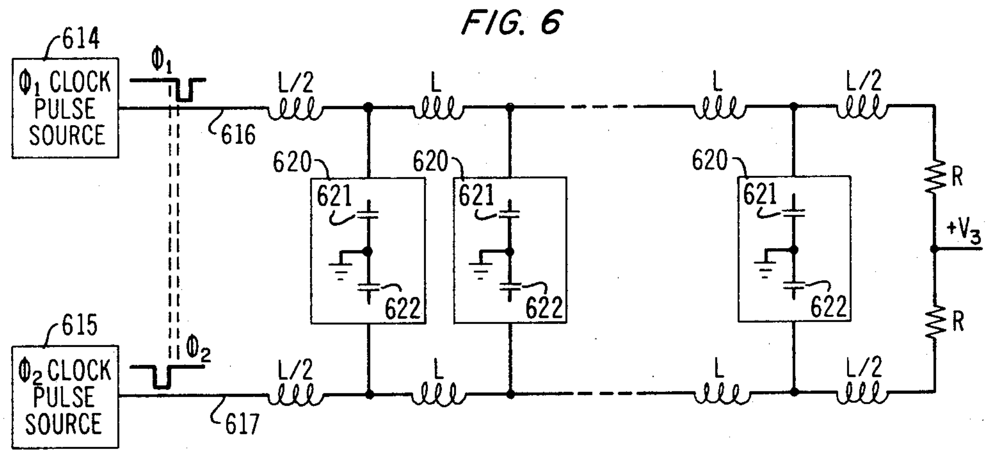
FIG. 6 depicts a complete two-phase clock pulse distribution system for a shift register.

FIG. 6 shows a complete two-phase clock pulse distribution system for a shift register. Each Block 620 represents a plurality of serially connected shift register stages. Although not shown in FIG. 6, each of the Blocks 620 is interconnected in series in the manner shown in FIG. 2. Within each Block 620 a Capacitor 621 symbolizes the total cumulative input capacitance of all of the clock terminals connected in parallel to the indicated node on the $\phi_1$ clock pulse distribution bus 616. As explained previously, this capacitance consists of the parasitic and intrinsic gate capacitances of two MOS devices for each stage within the block, if the register stage configuration of FIG. 1 is used. Under an AC analysis of the operation of the circuit these capacitances effectively shunt the clock pulses to ground. Similarly, each of the Capacitors 622 in the Blocks 620 symbolizes the total cumulative input capacitance of all of the clock terminals connected in parallel to the indicated node on the $\phi_2$ clock pulse distribution bus 617. Each of the Buses 616 and 617 is structured and operates in the manner of the delay line shown in FIG. 4 and explained previously. The $\phi_1$ clock pulse source 614 and the $\phi_2$ clock pulse source 615 produce identical pulses 180° out of phase. A small guard interval is included to separate the pulses and to preclude any possibility of improper operation of the individual shift register stages due to clock pulse overlap. This guard interval can be seen in the pictorial representation of the $\phi_1$ and $\phi_2$ clock pulses in FIG. 6 and is accomplished by asymmetrical on-off times for the pulses.

Figure 7:
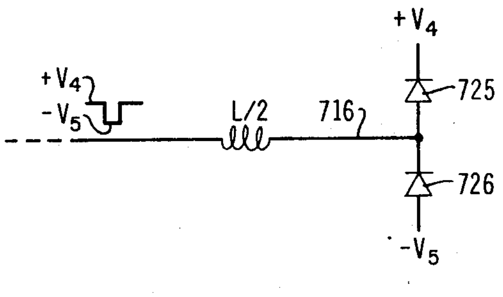
FIG. 7 shows an alternate method of for a clock pulse distribution bus to reduce power dissipation.

Power dissipation in the clock pulse distribution system of FIG. 6 predominantly occurs in the terminating resistors. This power loss can be reduced by replacing each of the resistive terminations with an active termination such as shown in FIG. 7. A Bus 716 is connected to the anode of a first Diode 725. The cathode of this diode is connected to a source of constant voltage, $+V_4$, equal to the maximum positive voltage of the clock pulses being applied to the bus. The Bus 716 is also connected to the cathode of a second Diode 726 whose anode is connected to another source of constant voltage, $-V_5$, equal to the maximum negative voltage of the clock pulses being applied to the bus. When the $+V_4$ portion of the applied pulse reaches the bus termination, the voltage doubles since the termination appears as an open circuit. Immediately upon doubling Diode 725 becomes forward biased and conducts, returning the pulse to ground through the voltage source with minimal power dissipation. Similarly, the $-V_5$ portion doubles at the open circuit termination and causes Diode 726 to conduct and provide a nonresistive path to ground. This active termination therefore removes the applied pulse from the bus without reflection and without substantial power dissipation.

It is to be understood that the above-described arrangement is merely illustrative of the application of the principles of the invention; numerous other arrangements may be devised by those skilled in the art without departing from the spirit and scope of the invention.

What is claimed is:

1. A shift register memory comprising:
   - a plurality of serially connected memory stages organized into uniform groups, each of said stages having an input terminal, an output terminal, and a clock terminal responsive to applied clock pulse signals to shift data between stages,
   - means for applying signals to the input terminal of the first stage of said serially connected plurality,
   - means for detecting signals at the output terminal of the last stage of said serially connected plurality,
   - bus means for distributing clock pulse signals applied thereto comprising a plurality of inductance elements connected in series, said clock terminals of said stages of each of said groups being connected to a corresponding node between inductance elements, and
   - terminating means connected to said bus means.

2. The memory in accordance with claim 1 wherein said terminating means comprises a resistor connected between the last of said plurality of inductance elements and a source of ground for said clock pulse signals.

3. The memory in accordance with claim 2 wherein said resistor has a magnitude equal to the characteristic impedance of said bus means.

4. The memory in accordance with claim 1 wherein said clock pulse signals are applied to the first of said plurality of inductance elements and wherein said first and the last of said inductance elements each have a magnitude equal to one-half that of the remainder of said plurality of inductance elements.

5. The memory in accordance with claim 1 wherein each of said plurality of memory stages further comprises a second clock terminal; and wherein said memory further comprises a second bus means for distributing clock pulse signals applied thereto comprising a plurality of inductance elements connected in series, said second clock terminals of said stages of each of said groups being connected to a corresponding node between inductance elements of said second bus means, and a second terminating means connected to said second bus means.

6. A clock pulse signal distribution system comprising:
   - first and second distribution buses each comprising a plurality of serially connected inductance elements, the first and last of said inductance elements having a magnitude L/2 and the remainder of said inductance elements having a magnitude L,
   - node points between said inductance elements on each bus to which clock terminals of devices are connected, an equal number of said clock terminals being connected at each node point,
   - first and second sources of clock pulse signals connected to said first and second distribution buses respectively, at the first of said inductance elements of each bus, for applying clock pulse signals thereto, and
   - first and second terminating means for said first and second distribution buses respectively, each terminating means comprising a resistor having a magnitude equal to the characteristic impedance of said distribution buses and connected between the last of said plurality of inductance elements of the associated bus and a DC voltage source.

* * * * *